(12) United States Patent
Burrows

(10) Patent No.: US 7,476,149 B2
(45) Date of Patent: Jan. 13, 2009

(54) PORTABLE GAME HANGER

(76) Inventor: Frank E. Burrows, 107 N. Ball St., Sedro-Woolley, WA (US) 98284

( * ) Notice: Subject to any disclaimer, the term of this patent is extended or adjusted under 35 U.S.C. 154(b) by 6 days.

(21) Appl. No.: 11/530,734

(22) Filed: Sep. 11, 2006

(65) Prior Publication Data

US 2008/0085669 A1  Apr. 10, 2008

(51) Int. Cl.
*A22C 18/00* (2006.01)
(52) U.S. Cl. ..................................... 452/187
(58) Field of Classification Search ......... 452/187–193; 212/180, 294, 299; 414/462, 540–543; 254/329, 254/332, 334; 294/81.1–81.5, 81.51, 19.1, 294/19.3, 24, 67.1–67.3, 67.31, 67.32
See application file for complete search history.

(56) References Cited

U.S. PATENT DOCUMENTS

| | | | |
|---|---|---|---|
| 2,256,123 A | 9/1941 | Medigovich | |
| 4,543,688 A | 10/1985 | Barchus | |
| 5,205,375 A * | 4/1993 | Shriver | 182/187 |
| 5,263,675 A * | 11/1993 | Roberts et al. | 248/219.4 |
| 5,562,534 A | 10/1996 | McGough | |
| 5,588,907 A | 12/1996 | DePietro et al. | |
| 5,791,858 A * | 8/1998 | Sasser | 414/462 |
| 5,820,455 A * | 10/1998 | Breedlove | 452/187 |
| 6,045,442 A | 4/2000 | Bounds | |
| 6,062,974 A * | 5/2000 | Williams | 452/187 |
| 6,202,868 B1 | 3/2001 | Murray | |
| 6,202,964 B1 | 3/2001 | Thornhill | |
| 6,250,483 B1 * | 6/2001 | Frommer | 212/180 |
| 6,695,688 B1 | 2/2004 | Owen et al. | |
| 6,705,821 B2 | 3/2004 | Philipps et al. | |
| 6,739,964 B2 | 5/2004 | Gearhart | |
| 6,994,618 B1 * | 2/2006 | Syers | 452/187 |

* cited by examiner

*Primary Examiner*—Thomas Price
(74) *Attorney, Agent, or Firm*—Black Lowe & Graham, PLLC

(57) ABSTRACT

A game hanger includes a curved first major plate secured to a curved minor plate by a vertical support. Straps engage the ends of the major plate and a tensioner used to tighten the straps around a tree or post. A horizontal support secures to the major plate, and may include multiple sections. A pulley system having two pulleys extends perpendicularly from the support. A first pulley is attached to the support near the end most distal to the tree. Game can be attached at the bottom of the second pulley by means of a spreader secured thereto.

21 Claims, 6 Drawing Sheets

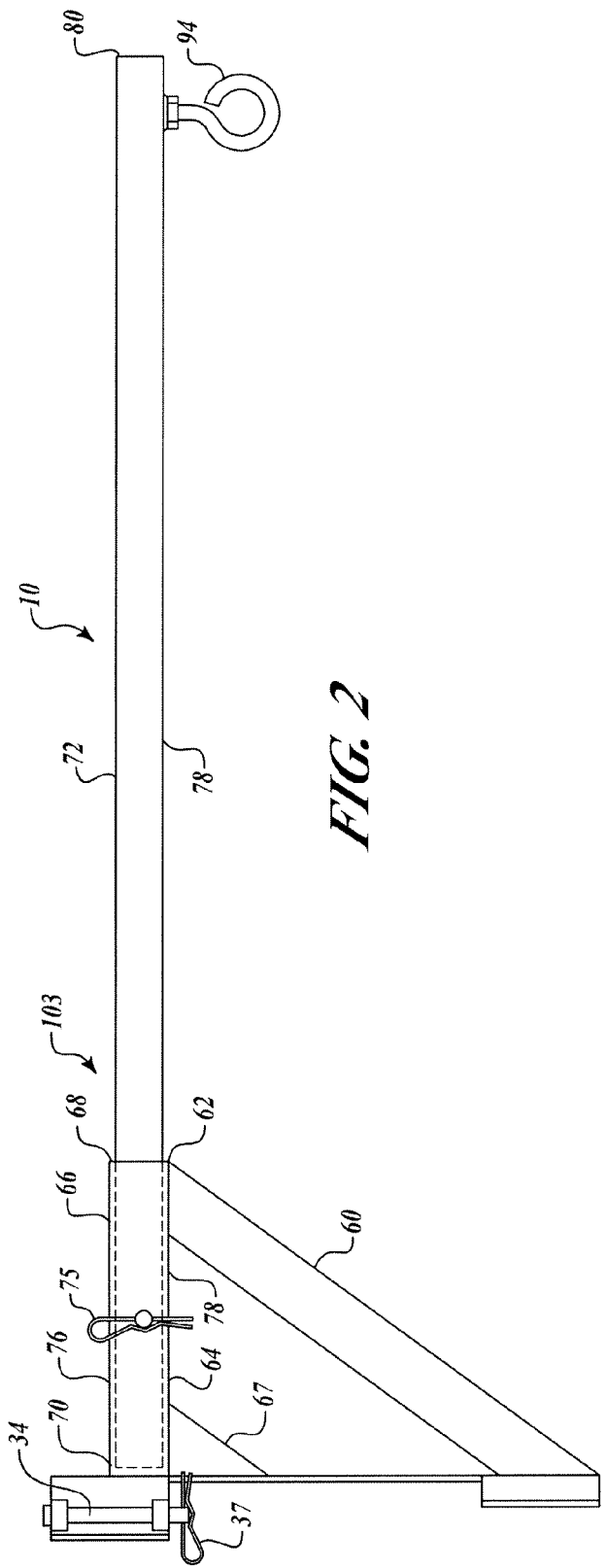
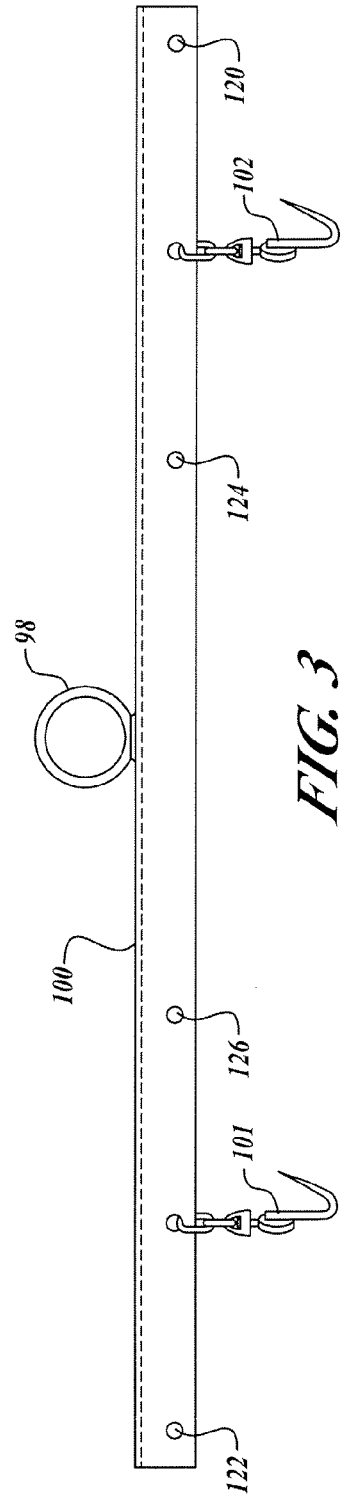

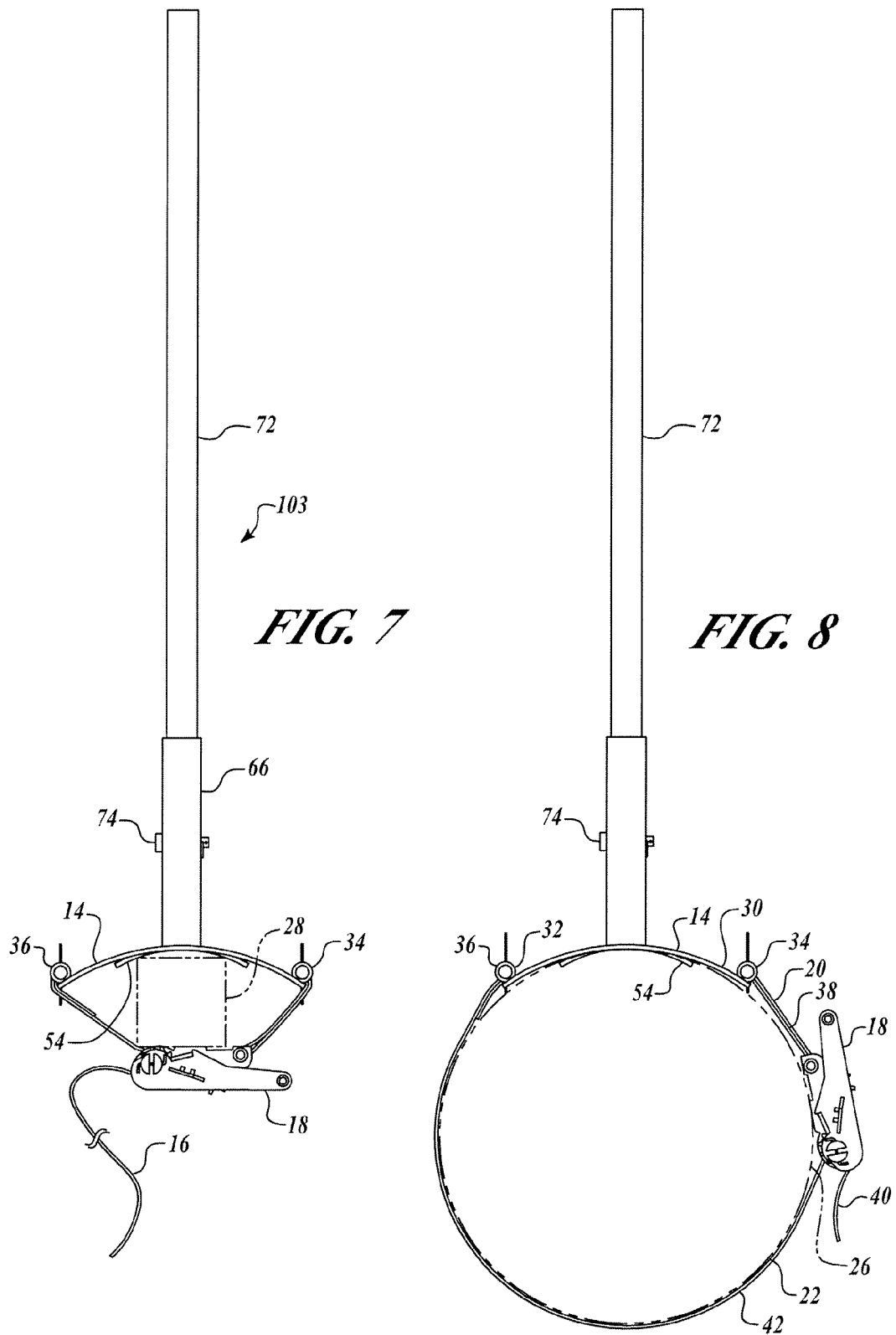

PORTABLE GAME HANGER

FIELD OF THE INVENTION

This invention relates generally to systems and methods for suspending game.

BACKGROUND OF THE INVENTION

It is desirable among hunters that they have a convenient and portable hanging apparatus for vertically hanging game that has been killed, so that the game can be more easily skinned, dressed, or moved without the hunter lifting the animal without assistance. Previously, hunters had to search out two trees spaced closely together to tie a rope in between and physically lift the animal. This has been unsatisfactory for a number of reasons. There have also been provided in the prior art, more complicated devices that include winches or other moving parts. These are difficult to transport and set up in the woods. And, a one pulley winch system is not the most efficient way for one person to lift a heavy animal. Other prior art uses jaws or clamps that can damage a tree. What is desired is a simple, convenient, tree friendly, and portable way for a hunter to lift game so that it can be easily skinned, dressed and moved.

U.S. Pat. No. 2,256,123 to Meligovich discloses a game hanger that has hooks that dig into a tree trunk to hold game up.

U.S. Pat. No. 4,543,688 to Barchus discloses an animal skinning holder that includes racket jaws and a clamp for holding a small animal's leg.

U.S. Pat. No. 5,263,675 to Roberts et al. discloses a support assembly having connectors to form a triangular support structure adapted to be mounted to a tree.

U.S. Pat. No. 5,562,534 to McGough teaches a portable game hoist and skinning aid that is attached to a tree by encircling straps. This game hoist also uses a one pulley winch system.

U.S. Pat. No. 5,588,907 to DePietro discloses a portable game hoist which includes a main beam that can be used for vertical support.

U.S. Pat. No. 5,820,455 to Breedlove discloses a portable animal hoist that is attached around a tree.

U.S. Pat. No. 6,045,442 to Bounds discloses a heavy duty game hoist that is attached to a pole or tree and that is non-rotating.

U.S. Pat. No. 6,062,974 to Williams discloses a portable game animal support that is foldable and attachable to a tree trunk.

U.S. Pat. No. 6,202,868 to Murray discloses a collapsible hoist that is collapsible without disassembly of major parts.

U.S. Pat. No. 6,202,964 to Thornbill discloses a multi-purpose hanger that is attached to a support by a strap.

U.S. Pat. No. 6,695,688 to Owens et al. discloses a one pulley winch type portable game hoist for attachment to a tree or a pole.

U.S. Pat. No. 6,705,821 to Philipps et al. discloses a collapsible game hanger for attachment to the tow hitch of a pick up truck.

U.S. Pat. No. 6,739,964 to Gearhart discloses a portable deer hoist that is attached to a tree and uses a one pulley winch system.

SUMMARY OF THE INVENTION

In order to overcome problems inherent in the prior art, there has been devised by the present invention improvements over conventional portable game hangers. The hanger of the present invention is strapped around a tree (or post) with an attacher, that comprises heavy duty strapping and a first major plate. The first major plate serves to compensate for torque and to hold the attacher in place. A minor plate secures to the major plate by means of a vertical bar such that torque is transferred along the vertical bar to the minor plate. A support, formed by two longitudinally interconnected square tubes, extends perpendicularly from the vertical bar. Near the end of the support most distal to the tree, a manual two to one pulley system having two pulleys extends perpendicularly from the support. A first pulley is attached to the support near the end most distal to the tree. Game can be attached at the bottom of the second pulley. A rope on the first pulley is pulled downwardly to hoist the animal off the ground and into the air, thereby providing pulley assistance in the lifting of the animal. The rope is then tied around the tree to maintain the game in an elevated position.

The pulley system is attached at its first end near the end of the support most distal to the tree and at the other end to a bar spreader making for easier and faster operation by one person. With the use of a simple two to one pulley system, the game hanger of the present invention is thereby lighter in weight, more portable, simpler to use and has less working parts than the use of a one pulley winch system. The portable game hanger of the present invention is light weight, easy to carry, set-up and take down by one person, which is an advantage for a single hunter.

BRIEF DESCRIPTION OF THE DRAWINGS

Preferred and alternative embodiments of the present invention are described in detail below with reference to the following drawings:

FIG. 2 is a side view showing the locked together square tube that forms the major support for the portable game hanger of the present invention.

FIG. 3 is a front view showing the details of the bar spreader of the present invention.

FIG. 7 is a top view of the portable game hanger of the present invention showing the game hanger as it would be positioned around a post.

FIG. 8 is a top view of the portable game hanger of the present invention showing the game hanger as it would be positioned around a tree.

DETAILED DESCRIPTION OF THE PREFERRED EMBODIMENT

Figure 1:
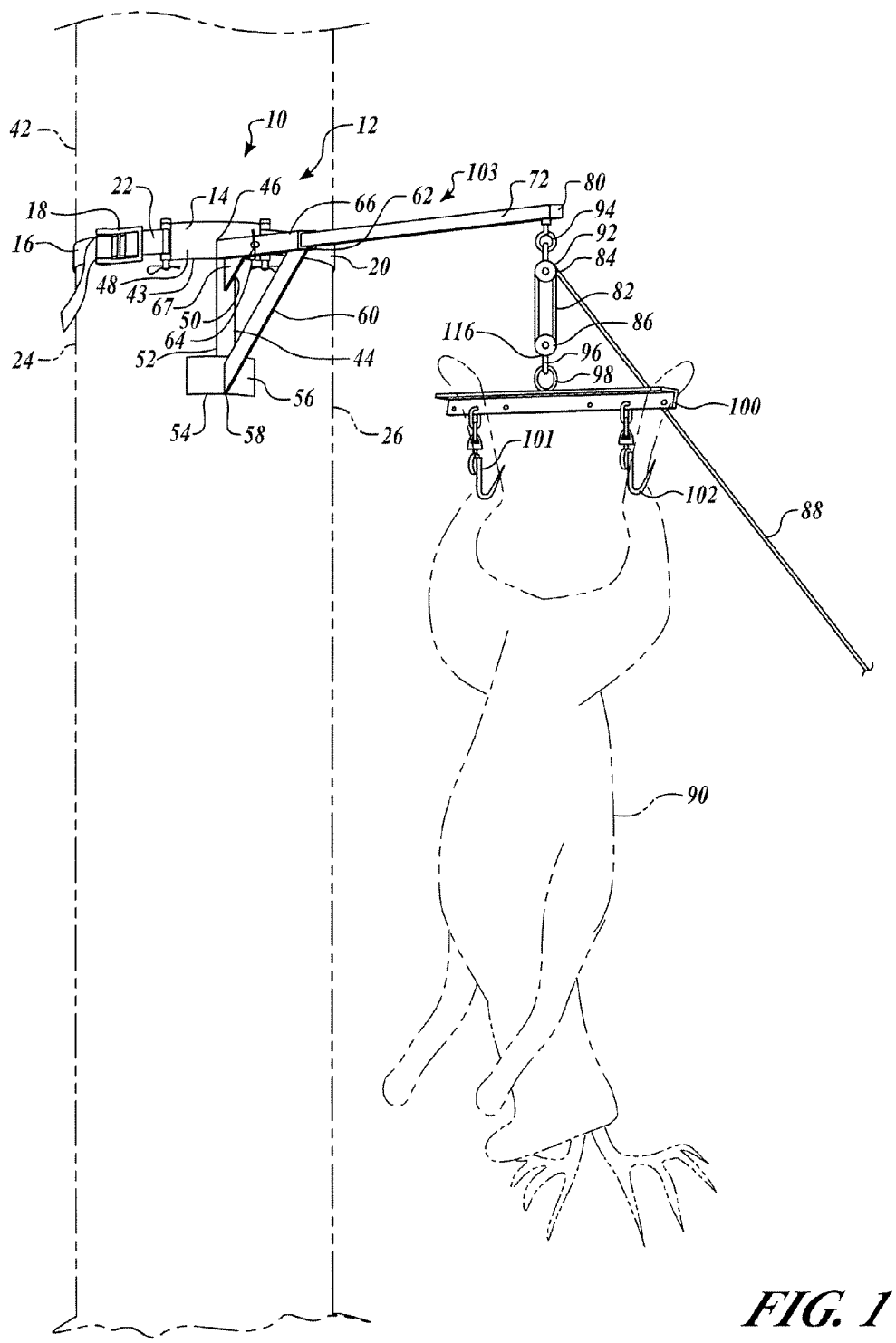
FIG. 1 is a side environmental view showing the features of the present invention positioned as it would be in use, around a tree.

Referring now to the drawings in general and to FIG. 1 in particular, there is shown a side environmental view showing the features of the present invention positioned as it would be in use, around a tree or post. The portable game hanger or device of the present invention is shown generally by the number 10. The portable game hanger 10 of the present invention comprises generally an attacher 12 in the form of a major plate 14, strapping 16, and a tensioner 18 for attaching two strands 20 and 22 of strapping 16 near the back 24 of a tree 26 or post 28, as seen most clearly in FIG. 7, behind the portable game hanger 10.

Figure 5:
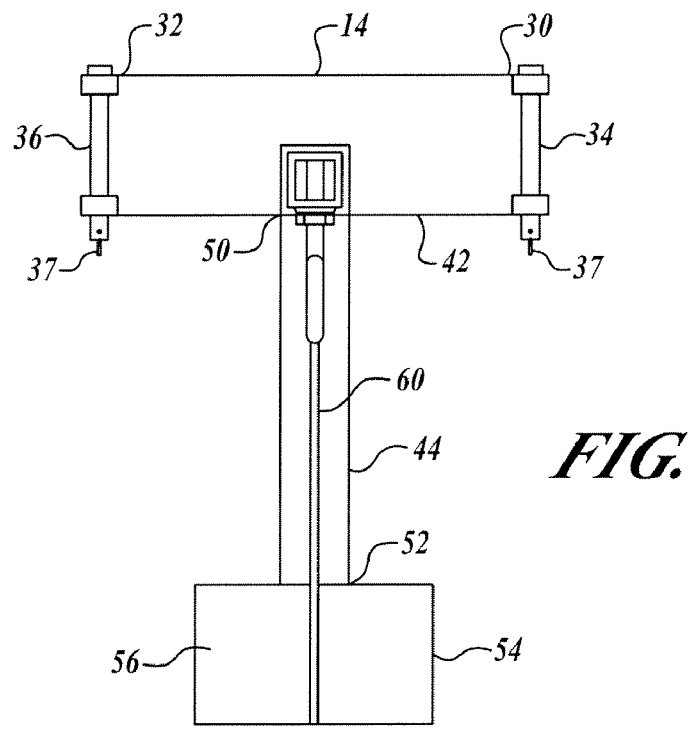
FIG. 5 is a rear view of the first major plate, the second minor plate and the vertical extending support that is positioned between the first major plate and the second minor plate.
Figure 6:
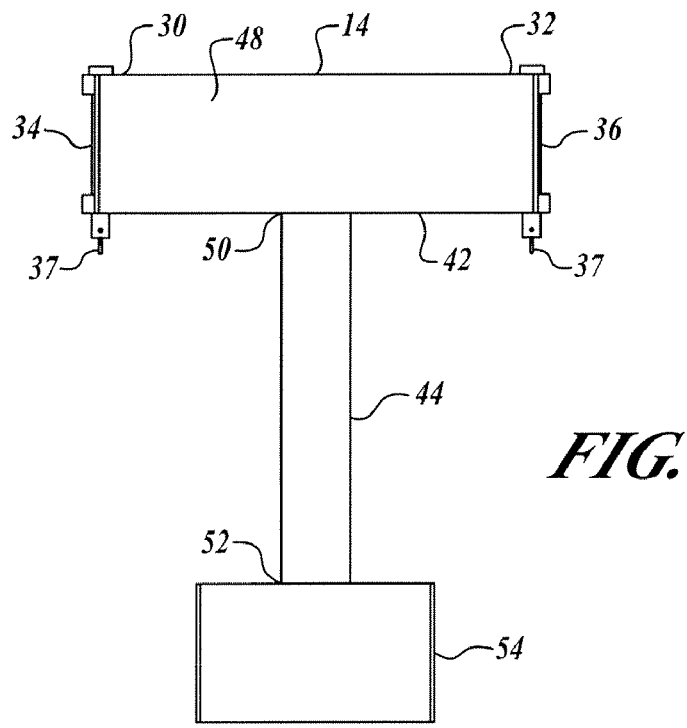
FIG. 6 is a front view of the same features as shown in FIG. 5.

The major plate 14 is preferably curved such that its radius of curvature approximates the radius of curvature of a typical tree trunk 26 or post 28. The major plate 14 has two ends 30 and 32, each end 30 and 32 having a strap engaging holder 34, 36 for attaching strapping 16 to each end 30 and 32 of the major plate 14, as seen most clearly in FIGS. 5 and 6. Each strap engaging holder 34 and 36 has a stop pin 37 associated therewith, such that as strapping 16 is fed through the strap engaging holder 34 or 36 it can be stopped and held in place in a particular position within the strap engaging holder 34 or 36. Only the strap engaging holder 34 is seen in FIG. 2 with its stop pin 37, but the strap engaging holder 36 also has a corresponding stop pin 37, as seen in FIGS. 5 and 6.

The tensioner 18 is preferably a heavy duty ratcheted cinch and is used to secure two ends 38 and 40 of the two strands 20 and 22 of strapping 16, as seen most clearly in FIG. 8, when the strapping 16 is secured behind the tree 26. The tensioner 18 is used to secure the portable game hanger 10 around a tree 26 or post 28. In operation, as previously described, the two strands 20 and 22 of strapping 16 are strapped around the tree 26 or post 28 on the side 42 of the tree 26 opposite the major plate 14, as seen most clearly in FIGS. 1 and 8. The operation of the tensioner 18 will be described hereinafter.

The major plate 14 is also heavy duty and serves to compensate for torque and to hold the attacher 12 in place. The lower part 43 of the major plate 14 pushes against the tree 26 or post 28 and transfers torque along the vertical extending support 44. The major plate 14 serves to distribute force over a much broader area to keep the game hanger 10 from moving or bending, as seen most clearly in FIG. 1. Fixedly and perpendicularly attached to the front surface 48 of the major plate 14 is the vertically extending support 44. The vertically extending support 44 has a top 50 and bottom 52. The vertically extending support 44 is attached at its top 50 to the front surface 48 of the major plate 14 and attached at its bottom 52 is a minor plate 54. The minor plate 54 is preferably smaller than the major plate 14. The minor plate 54 is also preferably curved such that it has a radius of curvature approximating that of a typical tree trunk 26 or post 28.

Extending at an angle from the front surface 56 of the second minor plate 54 is the bottom 58 of a support leg 60, as seen most clearly in FIG. 1. The top 62 of the support leg 60 is attached to the lower surface 64 of a horizontally extending support. The horizontally extending support may have any cross section suitable for supporting game hanging from the horizontal support, such as a box beam, hollow or solid squire and round beams, an I beam, or the like. In the preferred embodiment, the horizontal support is embodied as a first square tube 66. The support leg 50 extends at an angle between the horizontally extending first square tube 66 and the second minor plate 54 to provide support for the horizontally extending first square tube 66 of the game hanger 10. In a similar manner, another angled support 67 extends between the lower surface 64 of the horizontally extending first square tube 66 and the vertically extending support 44 to provide additional support for the game hanger 10.

Fixedly attached to the front surface 48 of the first major plate 14 is the horizontally extending first square tube 66 that has a front 68 and back 70, as seen most clearly in FIG. 2. The first square tube 66 is preferably used instead of a round tube because of its greater strength-to-weight ratio. Extending from the horizontally extending first square tube 66 is a slightly smaller second square tube 72 adapted to fit inside the first square tube 66, the second square tube 72 extending perpendicularly from the tree 26 or post 28. A pin 74 is inserted through the top portion 76 of the first horizontally extending first square tube 66 and through the bottom portion 78 of the horizontally extending second square tube 72 to thereby lock the second horizontally extending second square tube 72 in place within the horizontally extending first square tube 66, as seen most clearly in FIG. 4. In FIG. 2 it can be seen how a lock pin 75 holds the pin 74 in place when it is desired to use the pin 74 to lock the first square tube 66 and the second square tube 72 together.

Near the end 80 of the second square tube 72 that is distal to the tree 26 or post 28 there is removably attached a manual two to one pulley system 82, as seen most clearly in FIG. 1. The pulley system 82 includes a first pulley 84, a second pulley 86 and a length of rope 88, which can be pulled taut to lift game 90. The rope 88 can then be secured around the tree 26. The manual two to one pulley system 82 is attached at its top end 92 to a first attachment 94 embodied as an eye hook, that is in turn attached near the distal end 80 of the second square tube 72. The manual two to one pulley system 82 is attached at its bottom end 96 to a second attachment 98 that is in turn attached to a bar spreader 100. The bar spreader 100, is seen most clearly in FIG. 3 and is adapted to hold game 90 in a vertical position parallel to the tree 26, as seen in FIG. 1. The game 90 can be attached on the bar spreader 100 using two hooks 101 and 102, at the bottom 96 of the pulley system 82, as seen most clearly in FIG. 1, and the rope 88 on the pulley system 82 is pulled downwardly and wrapped around the tree 26 to hoist the animal off the ground and into the air, thereby providing pulley assistance in the lifting of the animal. With the use of a simple, manual, two to one pulley system 82, the portable game hanger 10 of the present invention is thereby lighter in weight, more portable, simpler to use, set up and take down by one person, and has less working parts than the use of a one pulley winch system.

In operation, the device 10 is stored in a dismantled configuration. The device 10 can be broken down making it more portable in limited space. The first square tube 66 is independent and removable from the second square tube 72. Upon set up, the second square tube 72 is inserted into and thereby attached to the first square tube 66, the tubes 66 and 72 are locked together, as previously described, thereby forming a locked and sturdy combined square tube 103.

The combined square tube 103 has fixedly attached thereto the first major plate 14, the first major plate 14 having two strands 20 and 22 of strapping 16 attached at each of two sides 30 and 32 of the first major plate 14. After the first 66 and second square tubes 72 are placed together to form the locked together square tube 103 and the first major plate 14 is positioned against a tree 26, the two strands 20 and 22 of strapping 16 are strapped around the tree 26 or post 28 near the side 42 of the tree 26 opposite the first major plate 14, as seen most clearly in FIG. 8.

The tensioner 18 is used to secure the portable game hanger 10 around a tree 26 or post 28. In operation, as previously described, the two strands 20 and 22 of strapping 16 are strapped around the tree 26 or post 28 on the side 42 of the tree 26 opposite the first major plate 14, as seen most clearly in FIGS. 7 and 8. The first strand 20 of strapping 16 is attached to the tensioner 18 emboided as a ratcheted cinch, as seen most clearly in FIG. 8. The second strand 22 of strapping 16 is fed through the center 104 of the spool 106 of the ratcheted cinch, as seen most clearly in FIG. 9. The ratchet 108 is operated causing the second strand 22 of strapping 16 to wind around the spool 106 thereby ratcheting up the slack in the strapping 16 and tightening the strap 16 around the tree 26 or post 28. A lock 110 on the cinch 18 tightens the tightened strap 112 in place and when it is desired to remove the portable game hanger 10, the release 114 serves to free the spool 106 from the ratchet 108, as seen most clearly in FIG. 9.

Near the end 80 of the one piece square tube 103 that is distal to the tree 26, there is positioned a first attachment 94 where the top 92 of the pulley system 82 is attached. At the bottom 96 of the pulley system 82 there is the second attachment 98 where the bar spreader 100 is attached. The game 90 can be attached to the bar spreader 100 which is attached at the second attachment 98 at the bottom 116 of the second pulley 86 of the pulley system 82, as seen in FIG. 1, and the rope 88 of the pulley system 82 is pulled downwardly and wrapped around the tree 26 to hoist the animal off the ground and into the air, thereby providing pulley assistance in the lifting of the animal, so that the above described operation can be performed by a single person.

Referring now to FIG. 2 of the drawings, there is shown the one piece locked together square tube 103 that forms the major support for the portable game hanger 10 of the present invention. It can be seen in FIG. 2 that the horizontally extending first square tube 66 has inserted thereinto the slightly smaller square tube 72. The slightly smaller square tube 72 thereby forming the strong locked together one piece tube 103 as previous described. FIG. 2 also shows a lock pin 75 is used to hold the place for the bolted pin 74 when it is desired to lock first square tube 66 together with the second square tube 72.

FIG. 3 is a front view showing the details of the bar spreader 100 of the present invention. FIG. 3 shows details of how hooks 101 and 102 are positioned on the bar spreader 100 to allow the hanging of game 90 from the bar spreader 100. It can be seen FIG. 3 that the length between the hooks 101 and 102 is adjustable for smaller or larger game moving the hooks 101 and 102 either further apart into holes 120 and 122 or closer-together into holes 124 and 126.

Figure 4:
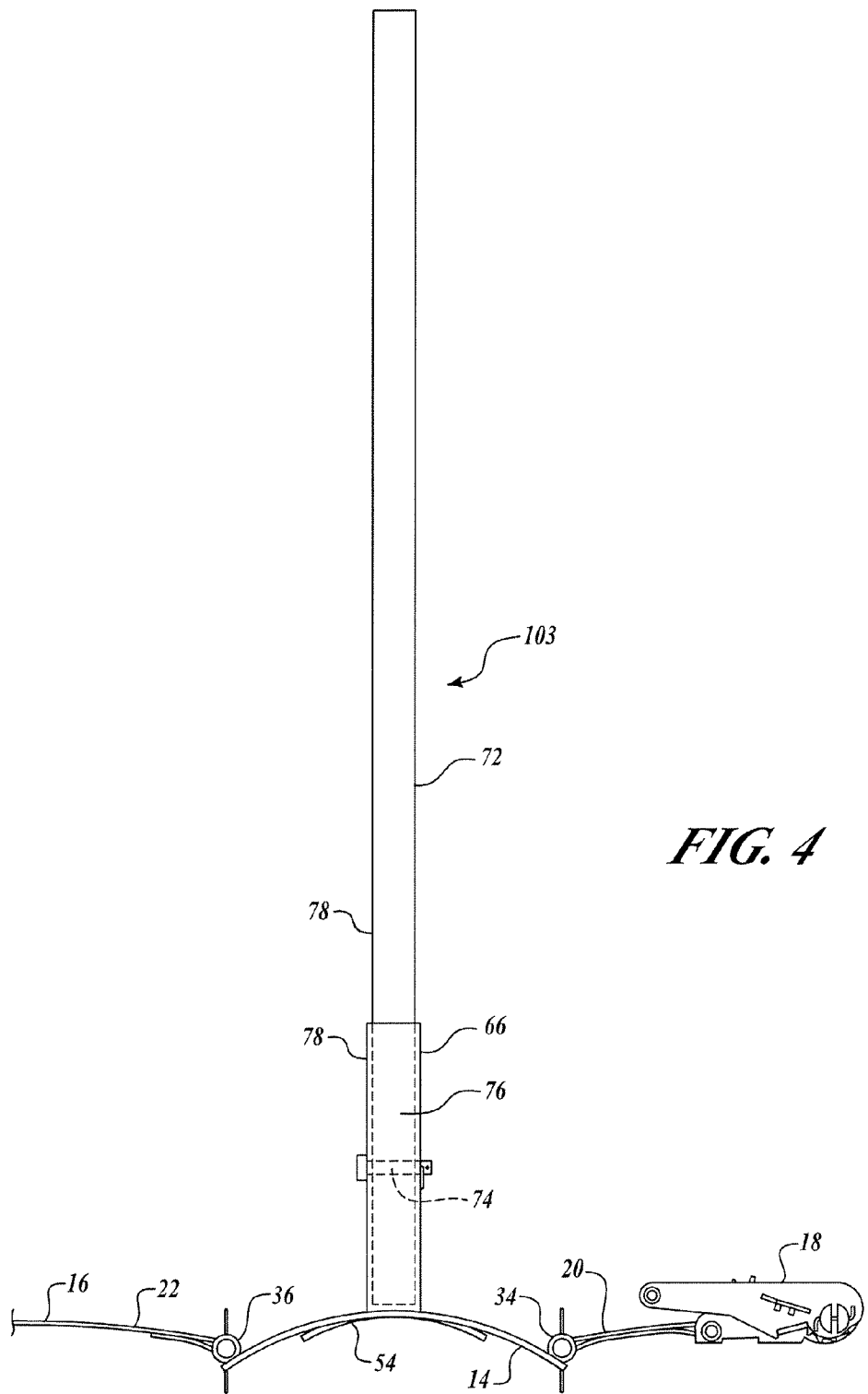
FIG. 4 is a top view of the portable game hanger of the present invention.

FIG. 4 is a top view of the portable game hanger of the present invent showing how the one piece locked together square tube 103 extends out horizontally form the major plate 14.

FIG. 5 is a rear view of the first major plate, the minor plate and the vertical extending support that is positioned between them. It can be seen in FIG. 5 that a triangularly extending support leg 60 provides additional support between the horizontally extending first square tube 66 and the second minor plate 54.

FIG. 6 is a front view of the same features of the present invention as shown in FIG. 5.

FIG. 7 is a top view of the portable game hanger of the present invention showing the game hanger as it would be positioned around a post. FIG. 7 shows how the strapping 16 can be shortened to a much shorter circumference by using the tensioner 18 to tighten the strapping 16 of the portable game hanger 10 around an object such as a post 28 with a smaller diameter than a tree.

FIG. 8 is a top view of the portable game hanger of the present invention showing the game hanger positioned around a tree 26 with the two strands 20 and 22 of strapping 16 positioned around the side 42 of the tree 26 opposite the first major plate 14.

Figure 9:
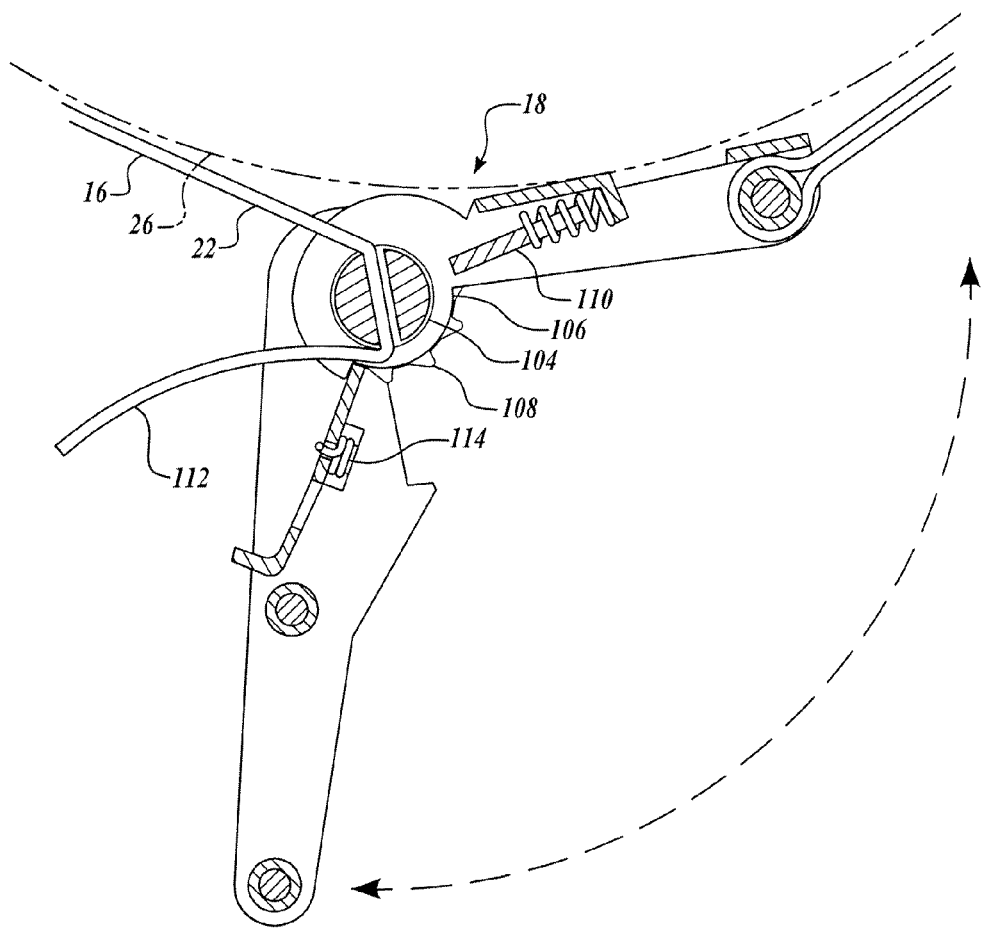
FIG. 9 is a side view of the heavy duty cinch that is used to secure the portable game hanger around a tree or post.

FIG. 9 is a side view of the ratcheted cinch that is used to secure the portable game hanger around a tree or post. It can be seen in FIG. 9 that a lock 110 and an unlock 114 serve to tighten or loosen the free end of strapping 16 to tighten the strapping around a tree 26 or post 28.

While the preferred embodiment of the invention has been illustrated and described, as noted above, many changes can be made without departing from the spirit and scope of the invention. Accordingly, the scope of the invention is not limited by the disclosure for the preferred embodiment. Instead, the invention should be determined entirely by reference to the claims that follow.

The embodiments of the invention in which an exclusive property or privilege is claimed are defined as follows:

1. A game hanger securable to a tree for suspending an animal comprising:
    a first curved plate having first and second ends;
    a strap secureable to the first and second ends of the first plate
    a tensioner engaging the strap;
    a second plate disposed vertically below the first plate and distanced from the first plate;
    a vertical support secured to the first and second plates;
    a horizontal support having a distal end and a proximal end, the proximal end secured to the first plate; and
    a pulley system secured to the horizontal support proximate the distal end.

2. The game hanger of claim 1, wherein the vertical support secures to a convex side of the first plate.

3. The game hanger of claim 1, wherein the first plate has a radius of curvature corresponding to a typical tree trunk.

4. The game hanger of claim 1, further comprising a spreader secured to the pulley system.

5. The game hanger of claim 1, wherein the pulley system has a two to one transmission ratio.

6. The game hanger of claim 1, wherein the horizontal support comprises first and second sections telescopically secured to one another.

7. The game hanger of claim 1, wherein the tensioner is a ratchet.

8. A game hanger securable to a tree for suspending an animal comprising:
    a first curved plate having first and second ends;
    a strap secureable to the first and second ends of the first plate
    a tensioner engaging the strap;
    a second curved plate disposed vertically below the first plate and distanced from the first plate;
    a vertical support secured to convex surfaces of the first and second plates;
    a horizontal support having a distal end and a proximal end, the proximal end secured to the convex surface of the first plate; and
    a pulley system secured to the horizontal support proximate the distal end.

9. The game hanger of claim 8, wherein the first plate is slightly curved and wherein the vertical support secures to a convex side of the first plate.

10. The game hanger of claim 8, wherein the first and second plates have a radius of curvature corresponding to a typical tree trunk.

11. The game hanger of claim 8, further comprising a spreader secured to the pulley system.

12. The game hanger of claim 8, wherein the pulley system has a two to one transmission ratio.

13. The game hanger of claim 12, wherein the pulley system comprises two pulleys.

14. The game hanger of claim 8, wherein the horizontal support comprises first and second sections telescopically secured to one another.

15. The game hanger of claim 8, wherein the tensioner is a ratchet.

16. The method of claim 15, wherein placing the first plate against the tree trunk comprises placing a concave surface of the first plate against the tree trunk.

17. The method of claim 16, wherein the first and second plate have a radius of curvature corresponding to a typical tree trunk.

18. The method of claim 17, wherein the pulley system has a two to one transmission ratio.

19. The method of claim 15, wherein suspending game from the horizontal support comprises securing a first end of a pulley system to the horizontal support and securing a second end of the pulley system to the animal.

20. A method for hanging game comprising:

placing a curved first plate having first and second ends against a tree trunk, the first plate having a horizontal support extending therefrom;

placing a second plate against the tree trunk, the second plate being distanced below the first plate and secured to the first plate;

securing a strap to the first and second ends of the first plate to capture the tree trunk between the first plate and the strap;

tensioning the strap; and suspending an animal from the horizontal support.

21. The method of claim 20, wherein the second plate is curved and wherein placing the second plate against the tree trunk comprises placing a concave surface of the second plate against the tree trunk.

* * * * *